United States Patent [19]
Podrazhansky et al.

[11] Patent Number: 5,694,023
[45] Date of Patent: Dec. 2, 1997

[54] CONTROL AND TERMINATION OF A BATTERY CHARGING PROCESS

[75] Inventors: Yury M. Podrazhansky, Alpharetta; Boris Tsenter, Norcross, both of Ga.

[73] Assignee: Advanced Charger Technology, Inc., Atlanta, Ga.

[21] Appl. No.: 677,483

[22] Filed: Jul. 10, 1996

[51] Int. Cl.$^6$ ................................................. H01M 10/44
[52] U.S. Cl. ........................ 320/21; 320/23; 320/4; 320/14
[58] Field of Search .................. 320/4, 13, 14, 320/21, 22, 23, 24, 32, 39

[56] References Cited

U.S. PATENT DOCUMENTS

| | | | |
|---|---|---|---|
| 3,597,673 | 8/1971 | Burkett et al. | 320/5 |
| 3,617,851 | 11/1971 | Du Puy et al. | 320/22 |
| 4,745,349 | 5/1988 | Palanisamy et al. | 320/22 |
| 4,829,225 | 5/1989 | Podrazhansky et al. | 320/14 |
| 5,307,000 | 4/1994 | Podrazhansky et al. | 320/14 |
| 5,543,701 | 8/1996 | Leung et al. | 320/4 |
| 5,561,360 | 10/1996 | Ayres et al. | 320/14 |

Primary Examiner—Peter S. Wong
Assistant Examiner—Patrick B. Law
Attorney, Agent, or Firm—Jones & Askew

[57] ABSTRACT

A method and an apparatus for adjusting the process of charging a battery so as to charge the battery as rapidly as possible while avoiding overheating of or damage to the battery. The method provides for applying a charging pulse (C1) which provides an average charging current, applying a first depolarizing pulse (D1), waiting for a first rest period (DW1), measuring the voltage (V1) at a predetermined point within the first rest period, applying a second depolarizing pulse (D2), waiting for a second rest period (DW2), measuring the voltage (V2) at the predetermined point within the second rest period, determining a difference between the voltage (V1) and the voltage (V2), and decreasing the average charging current if the difference is greater than a predetermined amount. The present invention also provides for determining whether the battery is low on water.

15 Claims, 6 Drawing Sheets

CONTROL AND TERMINATION OF A BATTERY CHARGING PROCESS

TECHNICAL FIELD

This invention relates to battery chargers and, more particularly, to a method and an apparatus for controlling the charging process for a battery and for terminating the charging process.

BACKGROUND OF THE INVENTION

There are several methods of charging a battery and several methods of determining when to terminate the charging process for a battery. These methods all suffer from the same problem: they will overcharge a battery. If a battery is overcharged it will produce oxygen on the positive electrode. This oxygen is then consumed by the negative electrode and the battery will heat up. The risk of some damage to batteries due to overcharging is normal procedure for most charging techniques. Battery manufacturers, to somewhat account for this, design batteries with extra negative electrode material. However, overcharging irreversibly consumes the negative electrode and, once the extra material is consumed, then future overcharging will reduce the amount of negative electrode available for the charge storage so the capacity of the battery will decline.

A well-documented effect of overcharging, particularly using direct current charging, is that the battery voltage will decrease. This decrease in the battery voltage is frequently referred to as minus delta V or negative delta V. One method of determining the state of charge is to detect the occurrence of minus delta V and to terminate the charging process on such occurrence. However, this method will reduce the battery life because the minus delta V occurs when an excess of oxygen is produced by the positive electrode and consumed by the negative electrode. As a consequence, this method allows the battery temperature to rise and also allows pressure to build up inside the battery.

Another method of determining when to terminate the charging process has been used when the battery is charged by forcing pulses of current though the battery and applying a discharge pulse after each charging pulse. In this method the charging process is terminated either in response to the average discharge current during the discharge pulse or in response to the ratio of energy removed by the discharge pulse compared to the energy provided to the battery during preceding charging pulse. However, there is not a strong relationship between discharge voltage value and the state of charge of the battery.

Another method of terminating the charging process provides for sampling the terminal voltage of the battery between charging pulses a predetermined time after the beginning of the charge.

Another method provides for measuring the battery voltage when a charging current is being applied and measuring the battery voltage during a discharging current. The two voltage measurements are compared and the charging process is terminated when there is a predetermined difference between these voltages. However, the predetermined difference must be selected depending upon the type of battery being charged and the capacity of the battery being charged. Furthermore, this method does not prevent the oxygen generating coincident with overcharging because it does not accurately determine the state of charge of the battery. The reason is that, if the battery is being charged at a fast rate of charge then, if there is a long discharge pulse, a nickel-cadmium (NiCd) or a nickel-metal-hydride (NiMH) battery will heat up and the amplitude of charging voltage will change because of the change in battery temperature. Thus, this method is not accurate for charging large batteries with a high speed of charge, because a minor error in determining the battery status can result in damage to the battery. To further complicate matters, the battery characteristics change during the charging cycle and vary from battery to battery.

Another method of controlling the charging cycle uses a "resistance free voltage" reading. The no-load ("resistance free") terminal voltage of the battery is measured after the end of a charging pulse. This voltage is compared with a reference voltage to determine the charging current. The reference voltage may be dependent upon, for example the ambient temperature, the internal temperature, the internal pressure, the charging current, or a change in value in the charging current. However, the measurement of the resistance free voltage must occur when all the cells in the battery are in an equilibrium mode. If an equilibrium condition has not been obtained then the voltage measurement of open circuit voltage can be different depending upon the time from the end of the previous charging pulse. The equilibrium time depends on the charging current and the mass transfer capability of the battery. Also, the accuracy of the measurement of the resistance free voltage will depend upon the concentration of the electrolyte in the battery and the age of the battery. The concentration of electrolyte will change, due to the porous structure of the plates surface, so measurement of the open circuit voltage milliseconds after the end of a charging pulse will not produce accurate results. Thus, the battery can be overheated or destroyed. Further, there are differences between batteries, differences between types of batteries, and differences in a single battery which occur during the charge cycle. Thus, selection of the proper reference voltage may be difficult or very time-consuming.

Any method which rapidly charges a battery must account for the constantly changing parameters of the battery, such as internal resistance, polarization resistance, mass transfer condition and temperature. A rapid charging system typically uses a tapering current to avoid an overcharge condition and avoid gas production. U.S. Pat. No. 5,307,000 discloses using multiple discharge pulses between each charging pulse and provides for rapidly charging a battery with high charging pulse currents for a longer period of time, without marginal voltages per cell and heat production. Without a plurality of depolarization pulses the voltage on the battery will rise very fast, due to a rapidly increasing concentration of electrolyte around the electrodes, particularly at the end of a charging pulse.

A rapid charging process must be based on a reliable and precise method of charging control and charge termination. Some previous charging methods have relied upon temperature cutoff, or other methods that are not appropriate and/or uniform for all types of batteries, and methods that even required selection of the battery capacity even when used for charging the same battery type (lead-acid, NiCd, NiMH). Other previous charging methods have relied upon voltage cutoff. However, a fixed voltage threshold is not reliable because the proper voltage threshold varies, depending upon the condition of the battery, the temperature, and the battery's previous use and charge history.

As is known in the prior art, the preferred technique for rapidly charging a battery involves forcing a high charging current into the battery, preferably by applying a series of charging and depolarizing pulses to the battery. As the charging process becomes faster and the instantaneous charging currents become higher, it is much more difficult to determine when the battery is fully charged and when the optimum time to terminate or modify the charging process occurs. Without precisely knowing when the battery is fully charged, both charging time and energy are wasted due to overcharging of the battery.

However, as stated above, overcharging causes gassing, generates heat, and increases pressure within the battery, thereby causing damage to the battery or potentially initiating a catastrophic thermal runaway condition in the battery. It is known that the battery is charged when the charging current has stabilized or has begun to increase after a gradual decrease during a constant voltage charging mode. However, this method relies upon a change in the terminal characteristics of the battery which occur when the battery is in close proximity to a thermal runaway condition. Thus, it is desirable to determine if the battery is charged without the battery being close to entering a thermal runaway condition.

It is possible to avoid the problems of gassing, heating, thermal runaway, and other damage to the battery by reducing the charging currents, extending the charging time, or terminating the rapid charging process at an early point based upon some selected criteria, for example, the amount of time that the charging process has been applied, the ampere-hours of charge forced into the battery, or the battery temperature. However, these methods may prematurely terminate the charging process, thereby leaving the battery in an undercharged condition, or substantially extend the time that is required for a subsequent method, such as a trickle charge, to bring the battery to a full charge. Also, using time or ampere-hours of charge as the determining criteria will cause catastrophic failure for a fully charged or nearly fully charged battery if a rapid charging process is applied to the battery because the battery will not be able to accept the high charging pulse currents. In this case, gassing and excessive heating of the battery will begin to occur almost immediately.

Therefore, there is a need for a method of accurately determining the state of charge of a battery, especially during a rapid charging process, so that the rapid charging process can be used as long as possible, thereby bringing the battery to or very near a fully charged condition, but the rapid charging process will be terminated at a point before damage occurs to the battery.

Further, during rapid charging process, at some point as the battery is becoming substantially charged, the battery may not be able to accept the full current from a charging pulse. Thus, some of the charge current delivered during the charging pulse causes gassing and heating. However, terminating the rapid charging process at this time would be premature because the battery is not fully charged and is still amenable to a rapid charging process, but at a lower charging current. Therefore, there is a need for a method of modifying a rapid charging process, as the battery is becoming charged, so as to continue rapidly charging the battery in an efficient manner.

Therefore, there is a need for a method of modifying a rapid charging process, as the battery is becoming charged, so as to continue rapidly charging the battery in an efficient manner.

SUMMARY OF THE INVENTION

The present invention is directed to accurately determining when a battery is charged. This allows a rapid charging process to be used as long as possible, thereby substantially charging the battery, but terminates the rapid charging process at a point which avoids overcharging the battery and thus avoids wasted charging time and energy and damage to the battery.

In the present invention, to determine when a battery is charged, a charging pulse is applied to the battery and then at least two discharging (depolarization) pulses are applied to the battery. The battery voltage is measured at a predetermined point in a rest (wait) period after a first depolarizing pulse and at the same relative point in a rest period after a second depolarizing pulse. The depolarizing pulse is created by applying a load across the terminals of the battery and is typically of a significantly shorter duration than the charging pulse.

When a charging pulse is applied to a lead-acid battery, the lead sulfate in the battery solution is converted into lead, lead oxide, and electrolyte ions. The lead and lead oxide are deposited on the respective electrodes. The electrolyte ions are formed at the electrodes and surround the electrodes. These electrolyte ions are dispersed by a transport phenomena due to the difference in the concentrations of the ions around the electrodes and the concentrations of the ions in the solution.

When a battery is mostly uncharged, the concentration of the electrolyte is small. Thus, the electrolyte ions formed around the electrodes are rapidly dispersed into the solution. However, when the battery becomes mostly charged, the difference in the concentrations is small and thus the ions disperse more slowly. Until the ions disperse, the lead sulfate cannot move to the vicinity of the electrodes. Thus, the ions form a barrier around the electrodes and prevent the electrodes from efficiently accepting another charging pulse. Further, there is less of the solution which can be converted by the charging process. Once this occurs, the charging voltage must be increased in order to force the battery to accept the same amount of charging current. However, increasing the charging voltage causes the water in the battery to disassociate into hydrogen gas and oxygen gas. The oxygen gas is rapidly reabsorbed into the solution. However, the hydrogen gas is absorbed very slowly and so the battery internal pressure builds up. If venting occurs the hydrogen gas is lost and so the battery has lost water. The battery will fail if this occurs too many times. Further, the higher voltage needed to charge the battery causes undesired heating of the battery and excessive heating may cause battery failure.

The present invention discloses that the state of charge of the battery, that is, the concentration of the electrolyte in the solution, can be determined by measuring the open circuit voltage of the battery during rest periods following discharge pulses. If the open circuit voltage is approximately the same from one rest period to a subsequent rest period, then the battery is not being overcharged so the charging current need not be changed. If the open circuit voltage decreases from one rest period to a subsequent rest period, then the battery is being overcharged or is being charged at a rate higher than the battery can accept so the charging current should be decreased or the charging process terminated.

Thus, when the battery becomes charged, the charging current should be reduced to the level that the battery will efficiently accept.

In the present invention, the battery is determined to be efficiently accepting a charge and the charging current need not be changed as long as the second voltage measurement is approximately the same as the first voltage measurement.

Also, in the present invention, the battery is determined to be mostly charged and the charging current should be reduced when the second voltage measurement is less than the first voltage measurement by some predetermined voltage difference ($\Delta V$).

Thus, the present invention provides for accurately determining the state of charge of the battery in a rapid charging process and controlling or terminating the charging process to avoid damage to the battery.

Therefore, it is an object of the present invention to a method of more precisely determining the state of charge of a battery by comparing the battery voltage between different rest periods.

The present invention provides a method for charging a battery. The method includes the steps of applying a charging pulse which provides an average charging current, applying a first depolarizing pulse, waiting for a first rest period, measuring the voltage of the battery at a predetermined point within the first rest period, applying a second depolarizing pulse, waiting for a second rest period, measuring the voltage of the battery at the predetermined point within the second rest period, determining a difference between the voltage at the predetermined point within the first rest period and the voltage at the predetermined point within the second rest period, and changing the average charging current depending upon the amount and polarity of this difference.

In one aspect of the present invention the steps of applying the charging pulse, applying the first and second depolarizing pulses, waiting for the first and second rest periods, and measuring the voltages within the first and second rest periods are repeated if the difference is within specified limits.

In another aspect of the present invention the charging pulse has a charging pulse duration and the step of changing the average charging current comprises changing the charging pulse duration.

In another aspect of the present invention the charging pulse has a charging pulse current amplitude and the step of changing the average charging current comprises changing the charging pulse current amplitude.

In another aspect of the present invention the charging pulse has a charging pulse repetition rate and the step of changing the average charging current comprises changing the charging pulse repetition rate.

In another aspect of the present invention each depolarizing pulse has a depolarizing pulse current amplitude and the method further includes changing the depolarizing pulse current amplitude when the average charging current is changed.

In another aspect of the present invention each depolarizing pulse has a depolarizing pulse duration and the method further includes changing the depolarizing pulse duration when the average charging current is changed.

In another aspect of the present invention a number of the depolarizing pulses follows each the charging pulse and the method further includes changing the number of the depolarizing pulses when the average charging current is changed.

The present invention also provides a method for charging a battery by a pulse charging process. The method includes applying a charging pulse, applying a first depolarizing pulse, waiting for a first rest period, measuring the voltage of the battery at a predetermined point within the first rest period, applying a second depolarizing pulse, waiting for a second rest period, measuring the voltage of the battery at the predetermined point within the second rest period, determining a difference between the voltage at the predetermined point within the first rest period and the voltage at the predetermined point within the second rest period, and terminating the pulse charging process if the difference is greater than a predetermined threshold.

The present invention also provides a method for determining the condition of a battery. The method includes applying a charging pulse to the battery, applying a first depolarizing pulse to the battery, waiting for a first rest period, measuring the voltage of the battery at a first predetermined point within the first rest period, measuring the voltage of the battery at a second predetermined point within the first rest period, applying a second depolarizing pulse to the battery, waiting for a second rest period, determining a difference between the voltage at the first predetermined point and the voltage at the second predetermined point, and indicating that water should be added to the battery if the difference is greater than a predetermined threshold then.

The present invention also provides a method for terminating the charging process for a battery. The method includes applying a charging pulse to the battery, applying a first depolarizing pulse to the battery, waiting for a first rest period, measuring the voltage of the battery at a first predetermined point within the first rest period, measuring the voltage of the battery at a second predetermined point within the first rest period, applying a second depolarizing pulse to the battery, waiting for a second rest period, measuring the voltage of the battery at a first predetermined point within the second rest period, measuring the voltage of the battery at a second predetermined point within the second rest period, determining a first difference between the voltage at the first predetermined point within the first rest period and the voltage at the second predetermined point within the first rest period, determining a second difference between the voltage at the first predetermined point within the second rest period and the voltage at the second predetermined point within the second rest period, and terminating the charging process if both the first difference is greater than a predetermined threshold and the second difference is greater than the predetermined threshold.

Other objects, features, and advantages of the present invention will become apparent upon reading the following description of the preferred embodiment, when taken in conjunction with the drawings and the claims.

DETAILED DESCRIPTION OF THE INVENTION

Figure 1:
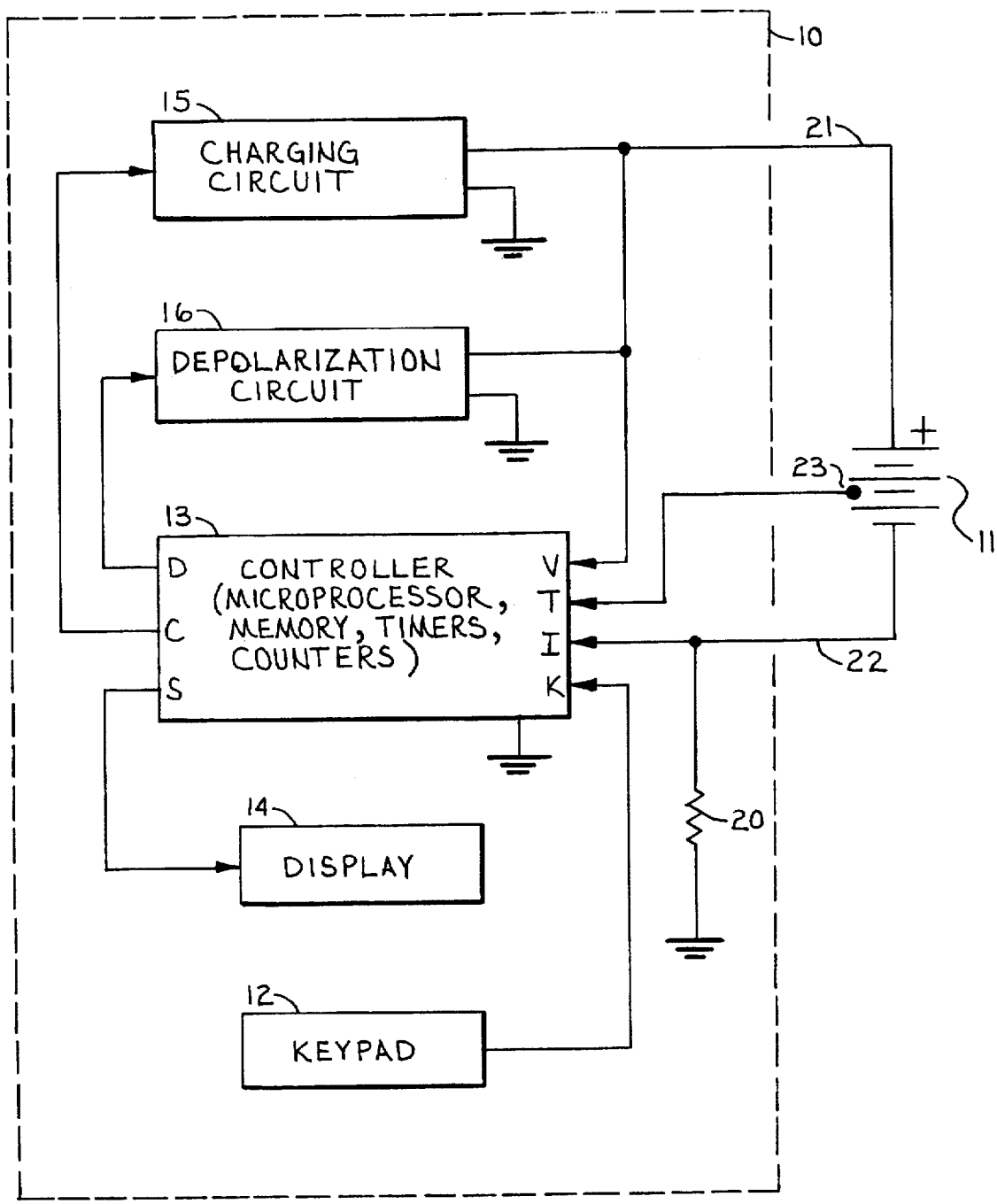
FIG. 1 is a block diagram of a battery charging circuit used in the present invention.

Turning now to the drawing, FIG. 1 is a block diagram of a battery charging circuit used in the present invention. The battery charging and discharging circuit 10 comprises a keypad 12, a controller 13, a display 14, a charging circuit 15, a discharging (depolarization) circuit 16, and a current monitoring circuit 20. The keypad 12 is connected to the "K" input of the controller 13 and allows the user to input specified parameters such as the battery type (lead acid, NiCd, NiMH, etc.) and other relevant information, such as nominal battery voltage or number of cells in series. The keypad 12 may be a keyboard, dial pad, array of switches, or other device for entering information. To simplify operations by the user, the controller 13 may be preprogrammed with the parameters for a plurality of battery types. In this case, the user would simply enter a battery type, such as a model number, and the controller 13 would automatically use the parameters appropriate for that battery type. The display 14 is connected to the "S" output of the controller 13 and displays the information, choices, parameters, etc., for the operator, and provides for audible and visible alarms or alerts for the operator.

The "C" output of the controller 13 is connected to the charging circuit 15. The charging circuit 15 provides a charging current to the battery 11. Depending upon the application, the charging circuit 15 may be configured by the controller 13 to perform as a constant voltage source or as a constant current source. The "D" output of the controller 13 is connected to the discharging (depolarization) circuit 16, which may be configured by the controller 13 to provide a constant depolarization current to the battery 11, apply a selected load to the battery 11, or apply a lower voltage or a reverse voltage to the battery 11. The pulse width of the pulses provided by circuits 15 and 16 are controlled by the controller 13. The output of the charging circuit 15 and the discharging circuit 16 are connected to the positive terminal of the battery 11 via conductor 21. The negative terminal of the battery 11 is connected to circuit ground through a current monitoring resistor 20. Current flowing into or out of the battery 11 may therefore be determined by measuring the voltage across the current monitoring resistor 20 on conductor 22. The current monitoring resistor 20 therefore functions as a current monitor and current limiter. Of course, other devices may be used to determine battery current.

Battery voltage is monitored by measuring the voltage between conductor 21 and circuit ground. The effects of the current monitoring resistor may be eliminated by measuring the voltage between conductors 21 and 22, or by subtracting the voltage on conductor 22 from the voltage on conductor 21. Conductors 21 and 22 are connected to the "V" and "I" input, respectively, of the controller 13.

Battery presence may be determined by activating the charging circuit 15 and monitoring the output of the current monitoring resistor 20 to determine if charge current is flowing, by activating the discharging circuit 16 and monitoring the output of the current monitoring resistor 20 to determine if charge current is flowing, by monitoring the voltage with both circuits 15 and 16 deactivated to determine if a battery is present, etc.

Temperature sensor 23 monitors the temperature of the battery 11 so that the controller 13 can adjust the magnitude, number, and duration of the charging pulses and the depolarizing pulses and the duration of the rest periods in order to maintain the desired battery temperature. Temperature sensor 23 preferably is immersed in the electrolyte solution of each battery cell to accurately report the internal battery temperature, even though only one is shown in the drawing. Temperature sensor 23 can be a thermostat, thermistor, thermocouple, or the like and is connected to the "T" input of the controller 13.

The controller 13 comprises a microprocessor, a memory, at least part of which contains operating instructions for the controller 13, timers, and an analog-to-digital converter. Using a microprocessor-based controller is advantageous because a microprocessor can make very rapid decisions, store voltage and current measurement data, and perform calculations on data, such as averaging, comparing, and detecting peaks. The timers, which can be discrete or implemented by the microprocessor, may be used for controlling the duration of any charging pulses, depolarizing pulses, or rest periods as well as providing time references between consecutive depolarizing pulses or rest periods. The analog-to-digital converter, which can be discrete or implemented by the microprocessor, may be used to convert the voltage or current signals into a form usable by the digital microprocessor. A digital controller is discussed because it is the preferred embodiment, but an analog controller may also be used to implement the present invention.

Figure 2A:
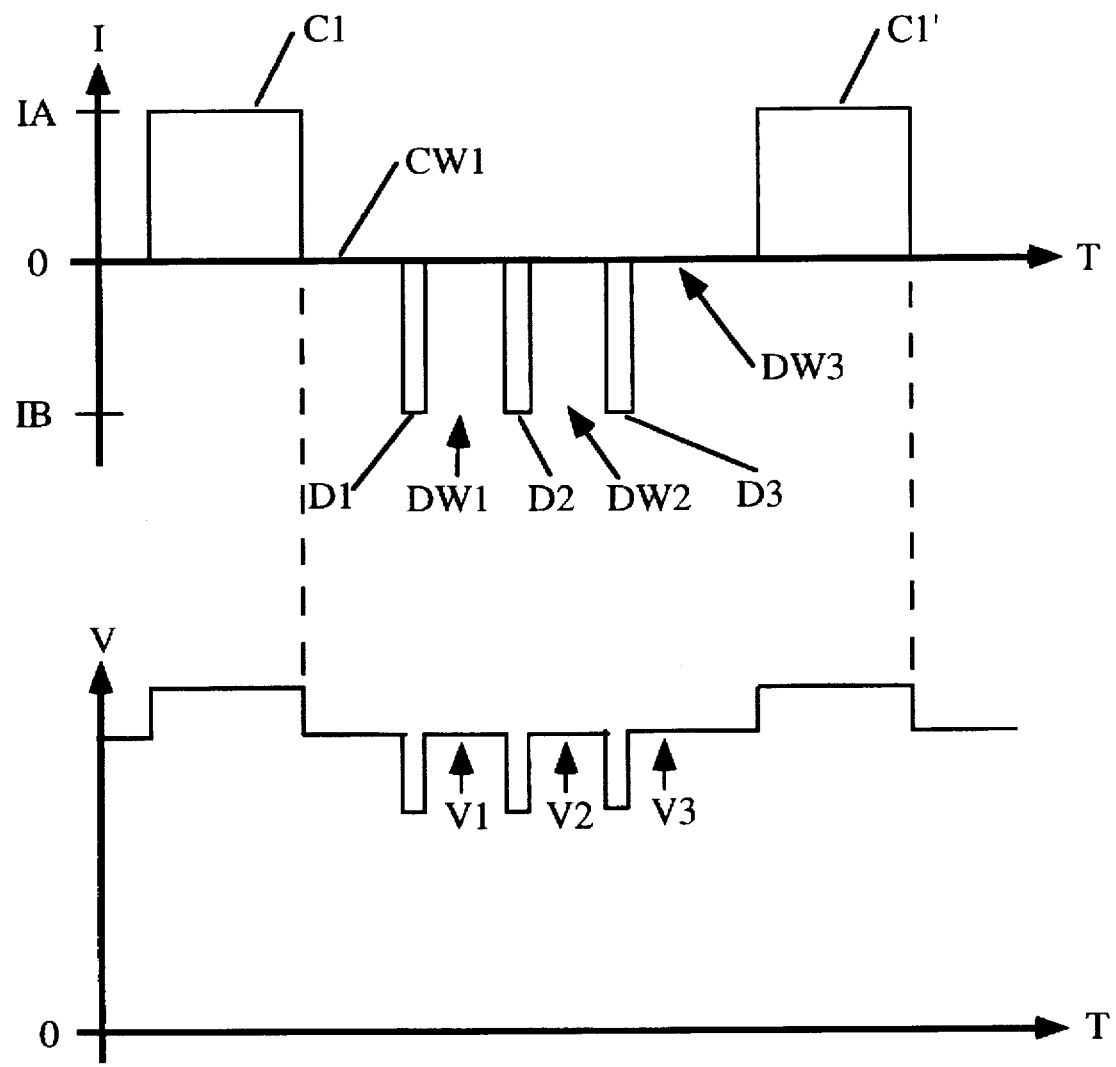
FIGS. 2A–2B show waveforms which illustrate a battery charging process and how the state of charge of the battery is determined by comparing voltage measurements taken in different rest periods.
Figure 2B:
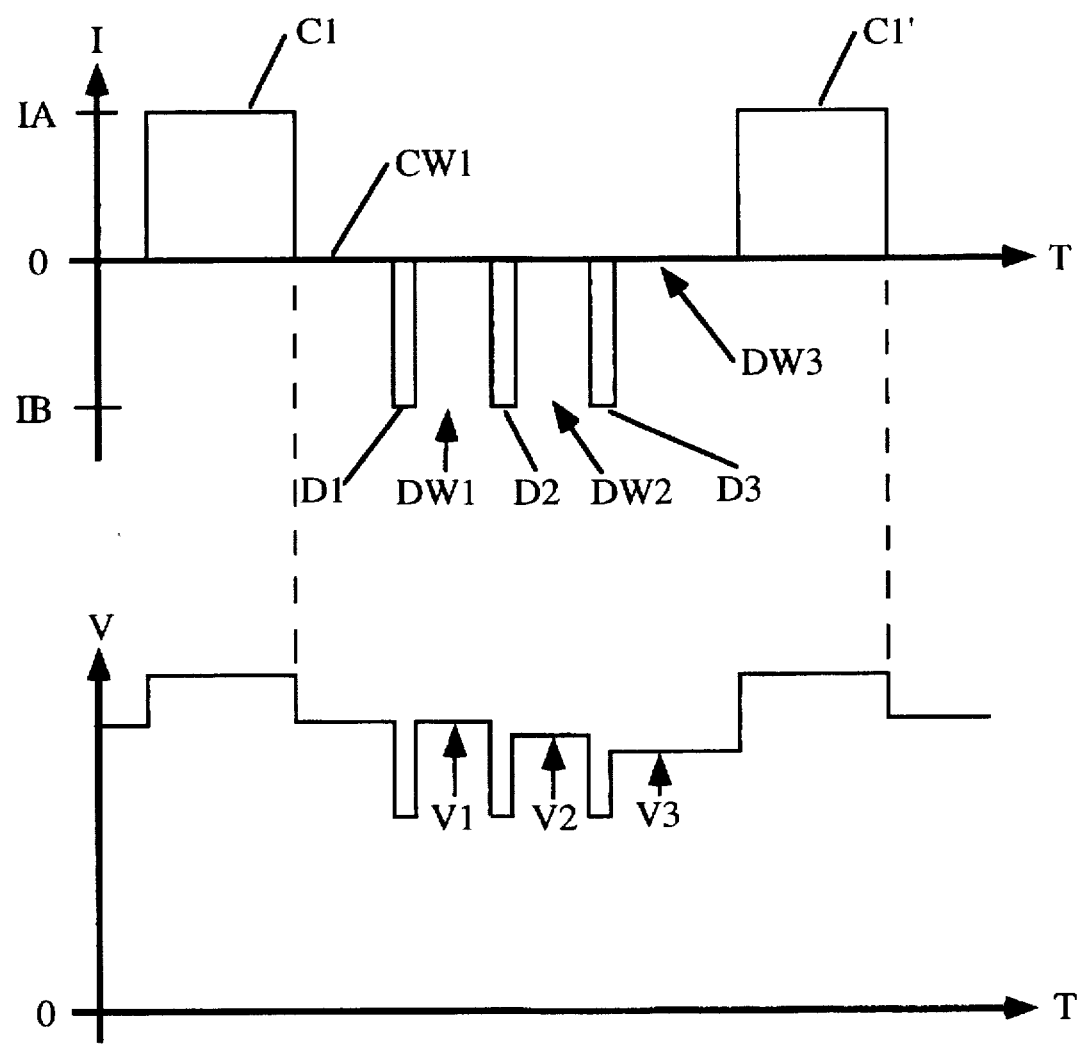

FIGS. 2A–2B show waveforms which illustrate a battery charging process and how the state of charge of the battery is determined. The state of charge is determined by comparing voltage measurements taken in different rest periods. The voltage and current waveforms generally illustrate the charging process which applies one or more charging pulses C1, preferably followed by a rest period CW1, and a plurality of depolarizing pulses D1–D3, each depolarizing pulse D1–D3, preferably followed by a rest period DW1–DW3, respectively.

For convenience of illustration, the charging pulses and depolarizing pulses are illustrated as rectangular pulses but it should be appreciated that this is often not the case in actual practice and thus the present invention should be understood to include, but not be limited to, rectangular waveforms. Also, for convenience only and not by way of limitation, the charging pulses C1, C1' are shown to have the same pulse width and the same charge current amplitude IA, and the depolarizing pulses D1–D3 are shown to have the same pulse width and the same discharge current amplitude IB. Additionally, the number of depolarizing pulses shown is purely for convenience and not by way of limitation. The rest periods CW1 and DW1–DW3 are shown to be of the same duration only for convenience and not by way of limitation. The controller 13 may alter the duration of such rest periods based on monitored changes in the state of charge of the battery.

First, with respect to comparing voltage measurements taken in different rest periods, specific voltage measurements V1 and V2 are shown on the voltage waveform in FIGS. 2A–2B. V1 and V2 are output voltage measurements of the battery taken when the battery is in an open circuit configuration during rest periods DW1 and DW2, respectively. It should be understood that the first output voltage measurement V1 can be made in the beginning, middle, or end of the rest period DW1, so long as the subsequent output voltage measurement V2 is taken at the same relative point in the next rest period DW2. The voltage levels during rest periods DW1–DW3 are measured and evaluated by the present invention.

In FIG. 2A it is seen that the voltage V1 is approximately equal to the voltage V2. This approximate equality in voltage indicates that this battery is being not being overcharged. Therefore, the charging current IA need not be adjusted.

In FIG. 2B it is seen that the voltage V1 is greater than the voltage V2. If the difference between V1 and V2 in FIG. 2B is less than 10 millivolts per cell then the charging current IA need not be adjusted. However, if the difference between V1 and V2 in FIG. 2B is greater than 10 millivolts per cell then this decrease in voltage from V1 to V2 indicates that this battery is being overcharged. This may be due to the battery reaching a full charge or may be due to the battery being unable to accept the full charging current IA for the duration of C1 for whatever reason. Therefore, the charging current IA should be decreased until the difference is less than 10 millivolts per cell.

Figure 3:
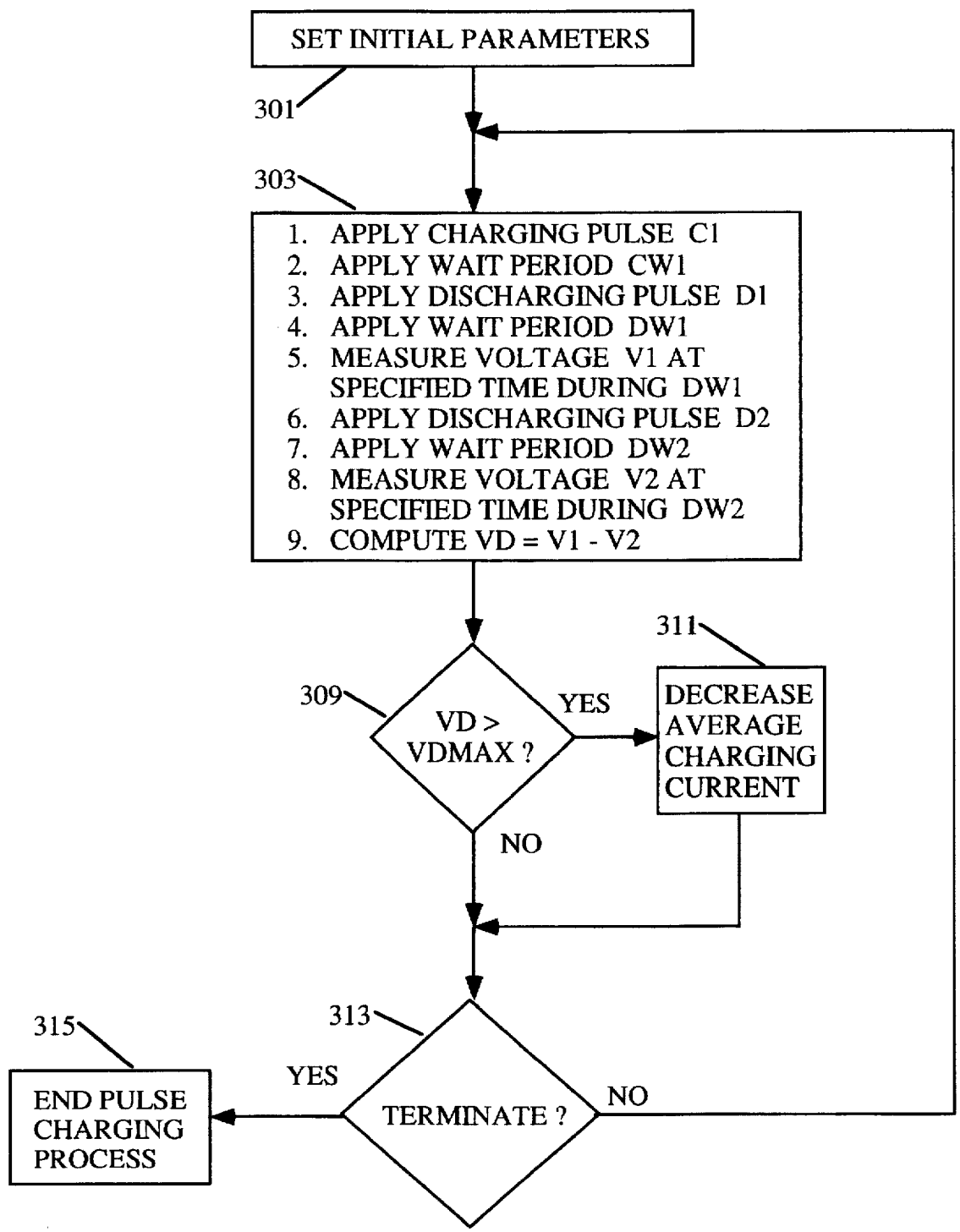
FIG. 3 is a flow chart illustrating the process of determining the state of charge of the battery.

FIG. 3 is a flowchart for determining if a battery is charged by comparing voltage measurements taken during one or more rest periods. In step 301, the initial charging parameters are set by the user, such as the battery voltage or number of cells in the battery and the discharge rating (C) for the battery. The controller 13 then determines the charging current IA and the depolarizing current IB for the battery. This may be based upon a look-up table or an equation, as preferred.

In step 303 the controller 13 applies a charging pulse C1 of current amplitude IA to the battery, preferably but not necessarily followed by a rest period CW1, and then applies a depolarizing pulse D1 to the battery of current amplitude IB to the battery. The controller 13 waits for a predetermined period of time DW1 and measures an output voltage V1 of the battery at a predetermined point in the rest period DW1. Controller 13 then applies another depolarizing pulse D2 of current amplitude IB to the battery. The controller again waits for a predetermined period of time DW2 and measures another output voltage V2 of the battery at a corresponding predetermined point in the second rest period DW2. It should be understood that the first output voltage measurement V1 can be made in the beginning, middle, or end of the first rest period DW1, so long as the subsequent output voltage measurement V2 is taken at the same relative point, relative to the beginning of the rest period, in the next rest period DW2.

Decithan 309 tests whether the difference (V1-V2) is greater than some maximum difference voltage (VDMAX). If not, then the battery is not yet charged and the average charging current does not have to be adjusted. In this case controller 13 will proceed to step 313.

If VD>VDMAX, then the battery is being overcharged or is being charged at a rate greater than the battery can properly accept. Therefore, in step 311 the controller 13 decreases the average charging current. Controller 13 then proceeds to step 313.

In step 313 the controller 13 determines whether to terminate the pulse charging process. The pulse charging cycle may be terminated for any one of several different reasons. For example, the charging time set by the user may have expired, or the battery temperature may be outside of an acceptable range, or the amplitude of the charging current IA may have been reduced to C/10 or less.

If a reason for termination of the pulse charging process has occurred then in step 315 the controller 13 will terminate the pulse charging process and will switch to another charging process, for example, trickle charging if termination is because the charging current is C/10, or the controller 13 will stop the charging process entirely, for example, if termination is because time has expired or the temperature is unacceptable. Also, a visual or audible indication of termination of the charge process may be provided to the operator.

If, at step 313, controller 13 determines that the pulse charging process is not to be terminated then controller 13 will return to step 303.

Figure 4:
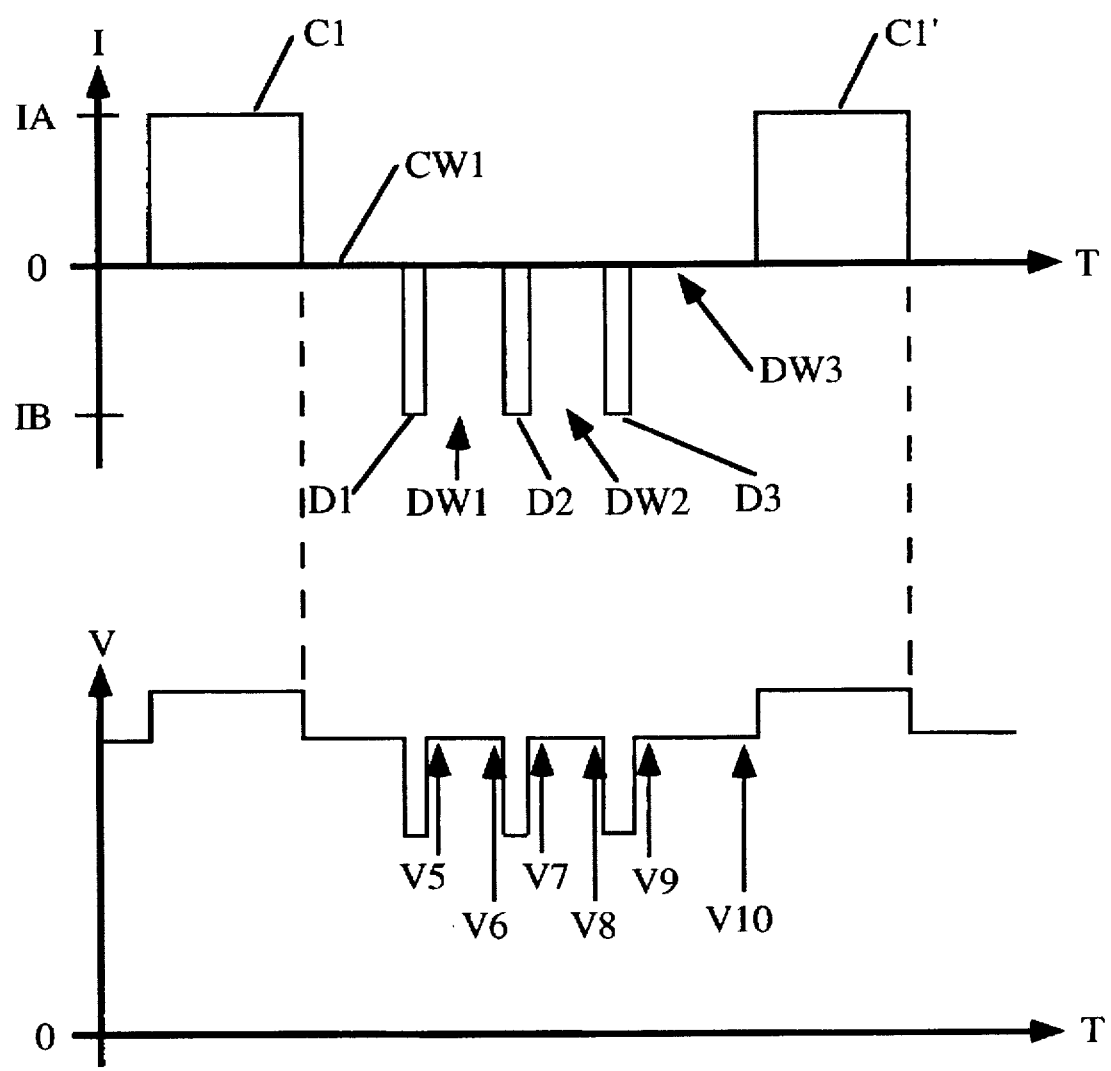
FIG. 4 shows waveforms which illustrate a battery charging process and how the condition of the battery is determined.

FIG. 4 shows waveforms which illustrate a battery charging process and how the condition of the battery is determined. In this procedure, the open circuit battery voltage is measured at the beginning and at the end of the rest periods. For convenience of illustration, and not as a limitation, the voltage is shown as essentially constant during a rest period. However, in practice, the voltage may vary during a rest period and this provides further information as to the condition of the battery, especially for lead-acid and NiCd batteries. If the voltage drops by more than a predetermined amount during a rest period (VD1=V5–V6 and VD1>VD1MAX) then the electrolyte concentration is above normal and water should be added to the battery. Audible and visual alarms may be used to alert the operator to this condition and the charging process may be automatically terminated. Preferably, the measurements are made during the first rest period DW1.

Also, if the voltage measurements at the beginning and at the end of one rest period (V5 and V6, respectively) are different by more than some predetermined amount (VD1= V5–V6 and VD1>VD2MAX), and the voltage measurements at the beginning and at the end of a subsequent rest period (V7 and V8, respectively, or V9 and V10, respectively) are also different by more than the predetermined amount (VD2=V7–V8 and VD2>VD2MAX), then this is an indication that the battery is not properly accepting the charge and therefore the charging process should be terminated.

Figure 5:
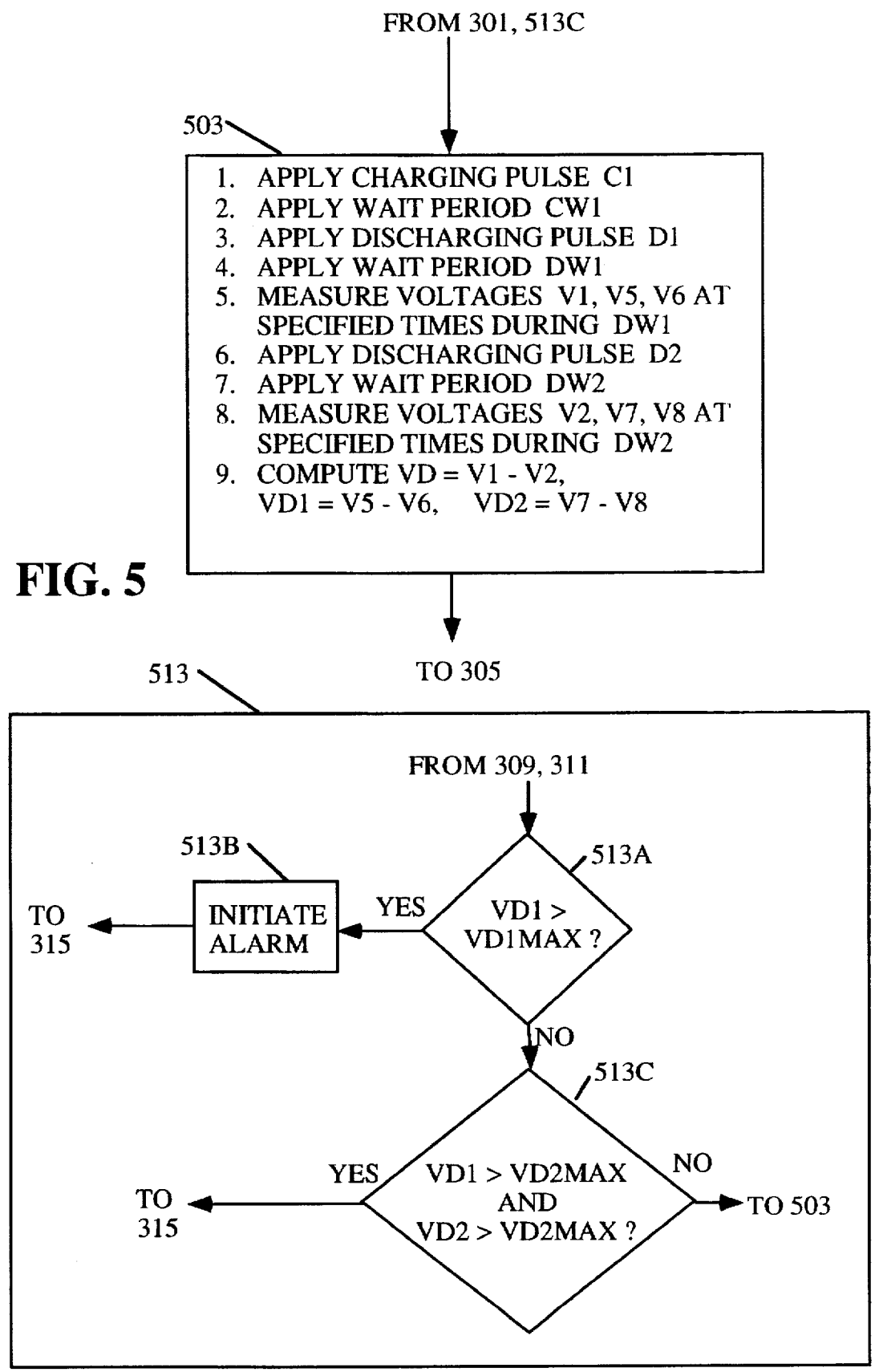
FIG. 5 is a modification of the flow chart of FIG. 3 which illustrates the process of determining the condition of the battery.

FIG. 5 is a flow chart illustrating a variation of the process of determining the condition of the battery. The process of FIG. 5 is identical to the process of FIG. 3 except that step 503 replaces step 303, and decision 513 provides an explanation of some of the termination steps of decision 313. In step 513, additional voltage measurements V5, V6, V7, and V8 are taken, and voltage differences VD1 and VD2 are determined.

In decision 513A, the controller 13 determines whether the voltage difference VD1 is greater than a predetermined maximum difference VD1MAX. If so, then in step 513B the controller 13 initiates an alarm to signal the operator to add water to the battery and then preferably terminates the charging process. If not, then in decision 513C the controller determines whether VD1 is greater than a predetermined maximum VD2MAX and VD2 is also greater than VD2MAX. If both conditions are met then the controller 13 terminates the charging process. The controller 13 may also signal the operator of the termination. If not then the controller 13 returns to step 503.

In the present invention, as described above, the charging current may be adjusted by adjusting IA, by adjusting the duration of the charging pulse, by adjusting the repetition rate of the charging pulses, by adjusting the number or the duration of the depolarization pulses, or by adjusting the duration of one or more of the rest periods CW1, DW1, DW2, etc. Preferably, when the charging current is adjusted, the depolarizing current is adjusted similarly, such as by adjusting IB, by adjusting the duration of the depolarizing pulses, or by adjusting the number of depolarizing pulses between each charging pulse.

As an example of the above process, for a lead-acid sealed battery with a 0.62 ampere-hour rating (C=0.62), IA is 2.4 amperes for 150 milliseconds, IB is 5 amperes for 2 milliseconds, and DW1 and DW2 are 12 milliseconds, and the repetition rate of the charge pulse (approximately 2 charge pulses per second) is such that the average charging current is 0.75 amperes (about 1.2C). CW1 may be used or may not be present. In this example, the pulse charging process will be terminated when the average charging current drops to 0.0623 amperes (0.1C). As another example, for a lead-acid sealed battery with a 52 ampere-hour rating (C=52), IA is 100 amperes and IB is 250 amperes, and the duration of the charge pulse is such that the average charging current is 60 amperes (about 1.2C), and the pulse charging process will be terminated when the average charging current drops to 5.2 amperes (0.1C).

Comparing the measured battery output voltage for consecutive rest periods after depolarizing pulses gives a better indication of the state of charge than in the prior art. As a result, this method (1) allows charging the battery as rapidly as possible, (2) avoids heating of and damage to the battery which may occur with continued charging or overcharging, and (3) allows earlier termination or modification of the charging process without overcharging of the battery.

Although it preferable to use the battery voltages measured during DW1 and DW2, the present invention is not so limited. The battery voltages may be measured for any two consecutive or non-consecutive discharge rest periods which are not separated by a charging pulse. For example, DW2 and DW3 may be used, or DW1 and DW3 may be used.

Further, the depolarization pulses may have the same amplitude or may have different amplitudes. Likewise, the depolarization pulses may have the same duration or may have different durations. In addition, the rest periods may have the same duration or may have different durations.

Although the present invention has been described with particularity with respect to sealed lead-acid batteries, the present invention is not so limited. The present invention is also useful for other types of batteries, for example, NiCd, NiMH, nickel-iron, nickel-zinc, silver-zinc, lithium-metal oxide, lithium ion-metal oxide, non-sealed lead-acid, etc.

It will be appreciated from the above that the present invention provides a method and an apparatus for rapidly charging a battery in a manner which does not cause overheating of the battery.

It will also be appreciated from the above that the present invention provides a method and an apparatus for charging a battery at a rate that the battery can accept without damage.

The present invention also provides a method and an apparatus for determining the condition of a battery, including determining whether water should be added to the battery.

From a reading of the description above of the preferred embodiment of the present invention, modifications and variations thereto may occur to those skilled in the art. Therefore, the scope of the present invention is to be limited only by the claims below.

We claim:

1. A method for charging a battery, comprising the steps of:

applying a charging pulse which provides an average charging current;

applying a first depolarizing pulse;

waiting for a first rest period;

measuring the voltage of said battery at a predetermined point within said first rest period;

applying a second depolarizing pulse;

waiting for a second rest period;

measuring the voltage of said battery at said predetermined point within said second rest period;

determining a difference between said voltage at said predetermined point within said first rest period and said voltage at said predetermined point within said second rest period; and if said difference is greater than a predetermined threshold then decreasing said average charging current.

2. The method of claim 1 and further comprising the step of repeating said steps of applying said charging pulse, applying said first and second depolarizing pulses, waiting for said first and second rest periods, and measuring said voltages within said first and second rest periods.

3. A method for charging a battery, comprising the steps of:

applying a charging pulse which provides an average charging current;

applying a first depolarizing pulse;

waiting for a first rest period;

measuring the voltage of said battery at a predetermined point within said first rest period;

applying a second depolarizing pulse;

waiting for a second rest period;

applying a subsequent depolarizing pulse;

waiting for a subsequent rest period;

measuring the voltage of said battery at said predetermined point within said subsequent rest period;

determining a difference between said voltage at said predetermined point within said first rest period and said voltage at said predetermined point within said subsequent rest period; and if said difference is greater than a predetermined threshold then decreasing said average charging current.

4. The method of claims 1 or 3 wherein said charging pulse has a charging pulse duration and said step of decreasing said average charging current comprises decreasing said charging pulse duration.

5. The method of claims 1 or 3 wherein said charging pulse has a charging pulse current amplitude and said step of decreasing said average charging current comprises decreasing said charging pulse current amplitude.

6. The method of claims 1 or 3 wherein said charging pulse has a charging pulse repetition rate and said step of decreasing said average charging current comprises decreasing said charging pulse repetition rate.

7. The method of claims 1 or 3 wherein each said depolarizing pulse has a depolarizing pulse current amplitude and wherein said method further comprises the step of decreasing said depolarizing pulse current amplitude when said average charging current is decreased.

8. The method of claims 1 or 3 wherein each said depolarizing pulse has a depolarizing pulse duration and wherein said method further comprises the step of decreasing said depolarizing pulse duration when said average charging current is decreased.

9. The method of claims 1 or 3 wherein a number of said depolarizing pulses follows each said charging pulse and wherein said method further comprises the step of decreasing said number of said depolarizing pulses when said average charging current is decreased.

10. The method of claims 1 or 3 wherein each said depolarizing pulse has a depolarizing pulse duration and wherein said step of decreasing said average charging current comprises increasing said depolarizing pulse duration.

11. The method of claims 1 or 3 wherein each said rest period has a rest period duration and wherein said step of decreasing said average charging current comprises increasing said rest period duration.

12. The method of claims 1 or 3 wherein each said charging pulse is followed by a number of depolarization pulses, and wherein said step of decreasing said averaging charging current comprises increasing said number of depolarization pulses.

13. A method for charging a battery by a pulse charging process, comprising the steps of:

applying a charging pulse;

applying a first depolarizing pulse;

waiting for a first rest period;

measuring the voltage of said battery at a predetermined point within said first rest period;

applying a second depolarizing pulse;

waiting for a second rest period;

measuring the voltage of said battery at said predetermined point within said second rest period;

determining a difference between said voltage at said predetermined point within said first rest period and said voltage at said predetermined point within said second rest period; and if said difference is greater than a predetermined threshold then terminating said pulse charging process.

14. A method for determining the condition of a battery, comprising the steps of:

applying a charging pulse to said battery;

applying a first depolarizing pulse to said battery;

waiting for a first rest period;

measuring the voltage of said battery at a first predetermined point within said first rest period;

measuring the voltage of said battery at a second predetermined point within said first rest period;

applying a second depolarizing pulse to said battery;

waiting for a second rest period;

determining a difference between said voltage at said first predetermined point and said voltage at said second predetermined point; and if said difference is greater than a predetermined threshold then indicating that water should be added to said battery.

15. A method for terminating the charging process for a battery, comprising the steps of:

applying a charging pulse to said battery;

applying a first depolarizing pulse to said battery;

waiting for a first rest period;

measuring the voltage of said battery at a first predetermined point within said first rest period;

measuring the voltage of said battery at a second predetermined point within said first rest period;

applying a second depolarizing pulse to said battery;

waiting for a second rest period;

measuring the voltage of said battery at a first predetermined point within said second rest period;

measuring the voltage of said battery at a second predetermined point within said second rest period;

determining a first difference between said voltage at said first predetermined point within said first rest period and said voltage at said second predetermined point within said first rest period;

determining a second difference between said voltage at said first predetermined point within said second rest period and said voltage at said second predetermined point within said second rest period; and if both said first difference is greater than a predetermined threshold and said second difference is greater than said predetermined threshold then terminating said charging process.

* * * * *